(12) United States Patent
Gittleman et al.

(10) Patent No.: US 7,524,344 B2
(45) Date of Patent: Apr. 28, 2009

(54) CARBON MONOXIDE ADSORPTION FOR CARBON MONOXIDE CLEAN-UP IN A FUEL CELL SYSTEM

(75) Inventors: Craig S. Gittleman, Brighton, NY (US); William H. Pettit, Rochester, NY (US); Gerald E. Voecks, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 513 days.

(21) Appl. No.: 11/243,084

(22) Filed: Oct. 4, 2005

(65) Prior Publication Data

US 2006/0032138 A1 Feb. 16, 2006

Related U.S. Application Data

(62) Division of application No. 09/780,184, filed on Feb. 9, 2001, now Pat. No. 6,964,692.

(51) Int. Cl.
*C10J 3/46* (2006.01)
(52) U.S. Cl. .................. 48/197 R; 48/128; 48/62 R; 48/85; 48/198.3; 422/190; 422/211; 429/19; 429/17; 429/20
(58) Field of Classification Search ............... 48/127.1, 48/127.9, 61, 75, 94, 107, 128; 422/190–191, 422/193–194, 222–223, 211, 209
See application file for complete search history.

(56) References Cited

U.S. PATENT DOCUMENTS

| 3,011,589 A | 12/1961 | Meyer |
| 3,564,816 A | 2/1971 | Batta |

(Continued)

FOREIGN PATENT DOCUMENTS

DE 4314225 11/1994

(Continued)

OTHER PUBLICATIONS

Sircar, S. M. Anand, B. T. Carvill, J. R. Hufton, S. Mayorga, and R. N. Miller, "Sorption Enhanced Reaction Process for Production of Hydrogen," Proc., U.S. DOE Hydrogen Program Rev., 1, 815 (1995).

(Continued)

*Primary Examiner*—Alexa D. Neckel
*Assistant Examiner*—Kaity V. Handal

(57) ABSTRACT

An apparatus removes carbon monoxide (CO) from a hydrogen-rich gas stream in a hydrogen fuel cell system. CO fouls costly catalytic particles in the membrane electrode assemblies of proton exchange membrane (PEM) fuel cells. A vessel houses a carbon monoxide adsorbent. The vessel may be a rotating pressure swing adsorber. A water gas shift reactor is upstream of the rotating pressure swing adsorber. The water gas shift reactor may include a second adsorbent adapted to adsorb carbon monoxide at low temperatures and to desorb carbon monoxide at high temperatures. The apparatus advantageously eliminates the use of a preferential oxidation (PROX) reactor, by providing an apparatus which incorporates CO adsorption in the place of the PROX reactor. This cleans up carbon monoxide without hydrogen consumption and the concomitant, undesirable excess low grade heat generation. The present invention reduces start-up duration, and improves overall fuel processor efficiency during normal operation.

5 Claims, 3 Drawing Sheets

U.S. PATENT DOCUMENTS

| | | | |
|---|---|---|---|
| 3,699,218 A | 10/1972 | Smith et al. | |
| 4,587,114 A | 5/1986 | Hirai et al. | |
| 4,696,682 A | 9/1987 | Hirai et al. | |
| 4,917,711 A | 4/1990 | Xie et al. | |
| 5,096,470 A | 3/1992 | Krishnamurthy | |
| 5,256,172 A * | 10/1993 | Keefer | 423/230 |
| 5,441,559 A | 8/1995 | Petit et al. | |
| 5,529,763 A | 6/1996 | Peng et al. | |
| 5,529,970 A | 6/1996 | Peng | |
| 5,604,047 A | 2/1997 | Bellows et al. | |
| 5,632,807 A | 5/1997 | Tomita et al. | |
| 5,646,305 A | 7/1997 | Wagner et al. | |
| 5,876,486 A | 3/1999 | Steinwandel et al. | |
| 5,891,217 A | 4/1999 | Lemcoff et al. | |
| 5,912,422 A | 6/1999 | Bomard et al. | |
| 5,958,109 A | 9/1999 | Fuderer | |
| 6,103,143 A | 8/2000 | Sircar et al. | |
| 6,162,558 A | 12/2000 | Borup et al. | |
| 6,328,945 B1 | 12/2001 | Hufton | |
| 6,692,545 B2 | 2/2004 | Gittleman et al. | |
| 6,921,597 B2 | 7/2005 | Keefer et al. | |

FOREIGN PATENT DOCUMENTS

| | | |
|---|---|---|
| DE | 4439682 | 5/1996 |
| DE | 0737648 A2 | 10/1996 |
| DE | 696 00 400 T2 | 3/2000 |
| DE | 696 04 438 T2 | 5/2000 |
| JP | 56015820 | 2/1981 |
| WO | WO 9928013 | 6/1999 |
| WO | WO 0016425 A1 | 3/2000 |

OTHER PUBLICATIONS

Carvill, B. T., J. R. Hufton, M. Anand, and S. Sircar, "Sorption Enhanced Reaction Process", AIChE J., 42(10), 2765 (1996).

Hufton, J. R., S. Mayorga, and S. Sircar, "Sorption Enhanced Reaction Process for Hydrogen Production", AIChE J., 45(2), 248 (1999).

Iyuke, S. E., Daud, W.R.W., Mohamad, A.B., Kadhum A.A.H., Fisal, Z., Shariff, A. M., "Application of Sn-activated carbon in pressure swing adsorption for purification of H2," Chemical Engineering Science 55 (2000) 4745-4755.

Ding, Y., Alpay, E., "Equilibria and Kinetics of CO2 Adsorption on Hydrotalcite Adsorbent," Chemical Engineering Science 55 (2000) 3461-3474.

Ding, Y., Alpay, E., "Adsorption-Enhanced Steam-Methane Reforming," Chemical Engineering Science 55 (2000) 3929-3940.

* cited by examiner

CARBON MONOXIDE ADSORPTION FOR CARBON MONOXIDE CLEAN-UP IN A FUEL CELL SYSTEM

CROSS-REFERENCE TO RELATED APPLICATIONS

This application is a divisional of U.S. patent application Ser. No. 09/780,184 filed on Feb. 9, 2001. The disclosure of the above application is incorporated herein by reference.

FIELD OF THE INVENTION

The present invention relates generally to a fuel processor for a hydrogen fuel cell engine, and more specifically to such a processor which uses carbon monoxide (CO) adsorption for CO clean-up.

BACKGROUND OF THE INVENTION

In proton exchange membrane (PEM) fuel cells, hydrogen ($H_2$) is the anode reactant (i.e. fuel) and oxygen is the cathode reactant (i.e. oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions for effective operation. These conditions include proper water management and humidification, and control of catalyst fouling constituents, such as carbon monoxide (CO).

For vehicular applications, it is desirable to use a liquid fuel such as alcohols (e.g. methanol or ethanol), other hydrocarbons (e.g. gasoline), and/or mixtures thereof (e.g. blends of ethanol/methanol and gasoline) as the source of hydrogen for the fuel cell. Such liquid fuels for the vehicle are easy to store onboard, and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam (and sometimes air) to yield a reformate gas comprising primarily hydrogen and carbon dioxide. For example, in the steam methanol reformation process, methanol and water (as steam) are ideally reacted to generate hydrogen and carbon dioxide. In reality, carbon monoxide is also produced requiring additional reaction processes. In a gasoline reformation process, steam, air and gasoline are reacted in a primary reactor which performs two reactions. One is a partial oxidation reaction, where air reacts with the fuel exothermally, and the other is a steam reforming reaction, where steam reacts with the fuel endothermically. The primary reactor produces hydrogen, carbon dioxide, carbon monoxide and water.

Reactors downstream of the primary reactor are required to lower the CO concentration in the hydrogen-rich reformate to levels tolerable in the fuel cell stack. Downstream reactors may include a water/gas shift (WGS) reactor and a preferential oxidizer (PROX) reactor. The PROX selectively oxidizes carbon monoxide in the presence of hydrogen to produce carbon dioxide ($CO_2$), using oxygen from air as an oxidant. Here, control of air feed is important to selectively oxidize CO to $CO_2$. Unfortunately, the preferential oxidation reactor is not 100% selective and results in consumption of hydrogen. The heat generated from the preferential oxidation reactor is at a low temperature, resulting in excess low-grade heat.

The operational gasoline fuel processor technologies to date do not meet automotive targets for start-up durations, mass, and volume. The start-up time for such a system is limited by the time delay until the combination of water gas shift and preferential oxidation reactors can supply stack grade hydrogen. The start-up duration is related to the mass of the catalyst system used for start-up and the energy needed to get the catalyst system up to its operating temperature. Another limitation of the current technology is the inability to utilize the low grade heat such a system generates. Any heat loss reduces the fuel processor thermal efficiency.

Thus, it is an object of the present invention to provide a fuel processor for a hydrogen fuel cell engine which provides a means to reduce the carbon monoxide content under normal operation before entering the fuel cell stack, thereby advantageously eliminating the use of a preferential oxidizer (PROX) reactor. It is a further object of the present invention to provide such a fuel processor which provides quick carbon monoxide uptake during start-up, thereby advantageously shortening start-up duration.

SUMMARY OF THE INVENTION

The present invention addresses and solves the above-mentioned problems and meets the enumerated objectives and advantages, as well as others not enumerated, by providing an apparatus for removing carbon monoxide (CO) from a hydrogen-rich gas stream. In one aspect, the hydrogen-rich stream is produced in a hydrogen fuel cell system which further includes membrane electrode assemblies where such hydrogen is reacted with oxygen to produce electricity. CO fouls costly catalytic particles in the membrane electrode assemblies, as described hereinabove. The apparatus comprises a vessel housing an adsorbent adapted to adsorb the carbon monoxide. The vessel may be a rotating pressure swing adsorber. The apparatus further comprises a water gas shift reactor upstream of the rotating pressure swing adsorber, wherein the water gas shift reactor may include a second adsorbent adapted to preferentially adsorb carbon monoxide at low temperatures and to desorb carbon monoxide at high temperatures.

The present invention advantageously eliminates the use of a preferential oxidation (PROX) reactor, by providing an apparatus which incorporates CO adsorption in the place of the PROX reactor. The present invention provides a means to reduce carbon monoxide content while minimizing hydrogen consumption and the concomitant, undesirable excess low grade heat generation. The present invention reduces start-up duration, and improves overall fuel processor thermal efficiency during normal operation.

BRIEF DESCRIPTION OF THE DRAWINGS

Other objects, features and advantages of the present invention will become apparent by reference to the following detailed description and drawings, in which:

FIG. 2 is a flow diagram of an alternate embodiment of the fuel cell system of the present invention; and.

DETAILED DESCRIPTION OF THE PREFERRED EMBODIMENTS

Figure 1:
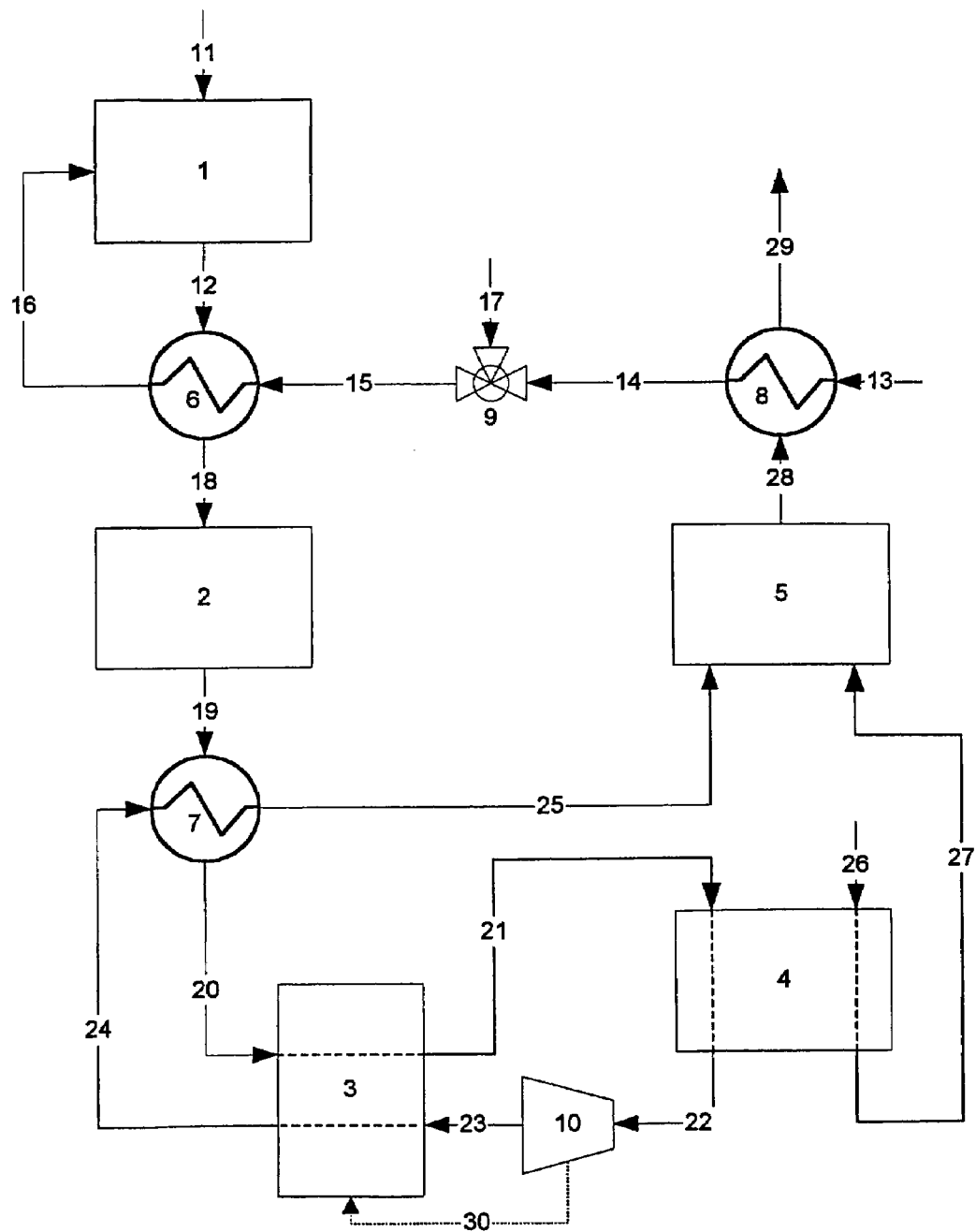
FIG. 1 is a flow diagram of the fuel cell system of the present invention.
Figure 2:
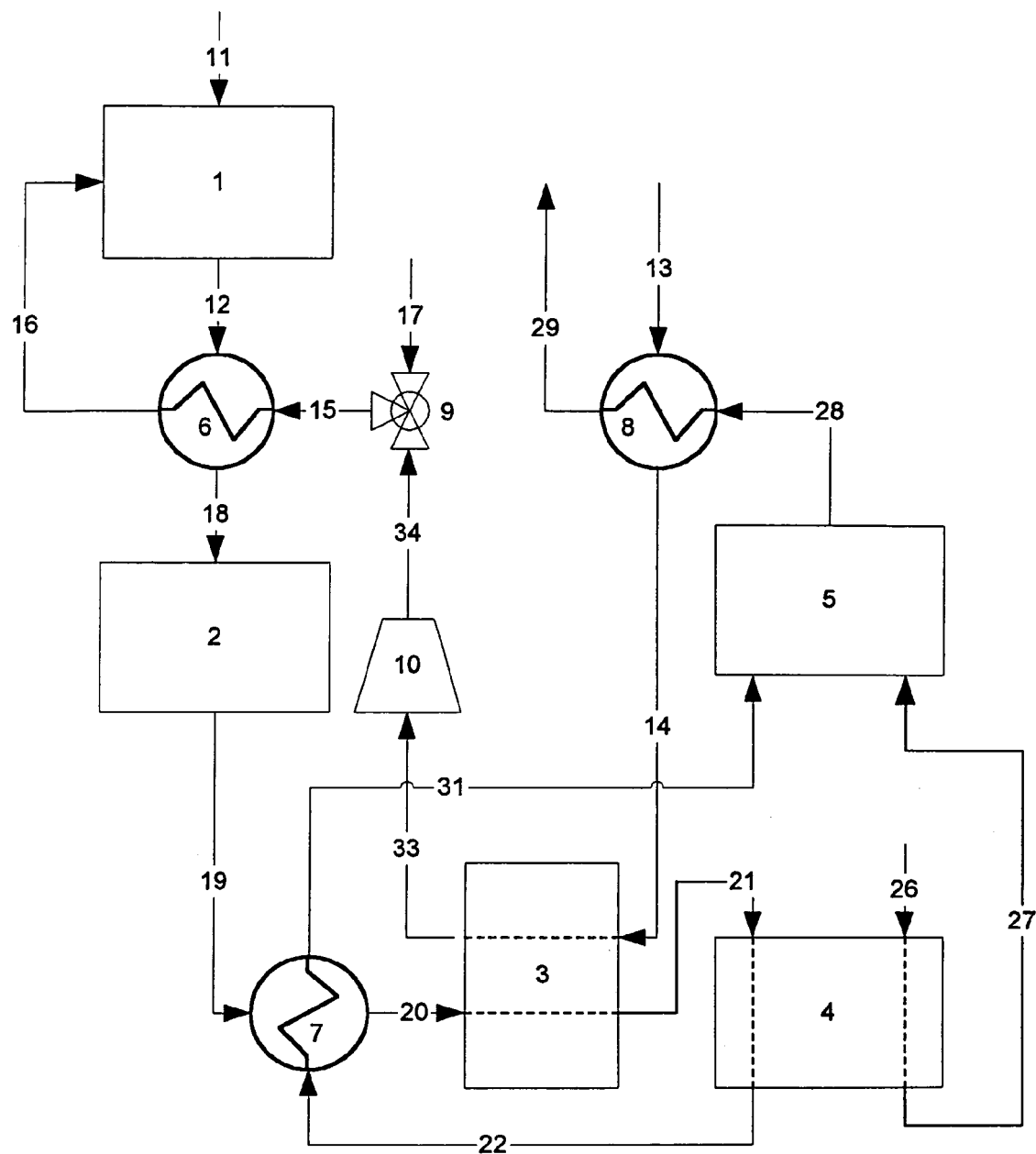

Flow diagrams of a preferred and alternate embodiment for a fuel processor system for a fuel cell vehicle using an adsorber as the primary means for carbon monoxide cleanup are shown in FIGS. 1 and 2, respectively.

Referring now to FIG. 1, hydrocarbon fuel such as, for example, gasoline, natural gas, methane, propane, methanol, ethanol, and/or mixtures thereof, etc. is fed into the fuel cell engine through stream 11. The fuel is fed into primary reactor 1 where it reacts with the steam/air mixture entering reactor 1 though stream 16. The steam is generated in heat exchanger 8, where liquid water from stream 13 is heated and vaporized by the hot exhaust stream 28 coming from combustor 5. The steam exits heat exchanger 8 in stream 14 and is blended with compressed air stream 17 in mixing valve 9. The steam/air mixture stream 15 is further heated in heat exchanger 6 to form hot steam/air mixture stream 16 for feed into primary reactor 1. The heat required to raise the temperature of stream 15 in heat exchanger 6 comes from stream 12, which is the effluent stream from primary reactor 1. Alternatively, the air and water can be heated separately and mixed either within or before the primary reactor 1.

Primary reactor 1 contains a steam reforming and/or partial oxidation catalyst suitable for the specific fuel used. The temperature of reactor 1 depends on the nature of the fuel and the relative compositions of fuel, air and water, and is typically between about 300° C. and about 1200° C. In primary reactor 1, the fuel is converted to a hydrogen-rich reformate gas either by partial oxidation, steam reforming, or autothermal reforming. The reformate gas leaving primary reactor 1 in stream 12 contains primarily hydrogen, nitrogen, carbon monoxide, carbon dioxide, water, and possibly methane. The carbon monoxide concentration in stream 12 is typically between about 1 mole % and about 20 mole %. Stream 12 is cooled in heat exchanger 6 as described above to the operational temperature of water gas shift reactor 2. The cooled reformate gas exits heat exchanger 6 as stream 18. Alternatives (not shown in FIG. 1) allow for additional water to be fed directly into water gas shift reactor 2 or blended with stream 18 as required by the water gas shift reaction.

Water gas shift reactor 2 is either a high temperature water gas shift reactor (320° C.-500° C.), a medium temperature shift reactor (250° C.-400° C.), or a low temperature water gas shift reactor (150° C.-250° C.). Alternatively, reactor 2 may consist of both a high and a low temperature water gas shift reactor with some means of cooling the reformate gas as it flows between the high and low temperature reaction zones. In reactor 2, carbon monoxide and water are converted to hydrogen and carbon dioxide via the water gas shift reaction.

One of the advantages of the present invention is the possibility of using only a high temperature water gas shift reactor, which is generally smaller than a low temperature water gas shift reactor, or a system with both high and low temperature water gas shift reactors, even though the high temperature water gas shift reactor does not reduce the CO to very low levels due to equilibrium constraints. This is possible because of the ability of the adsorber to handle relatively high CO levels that cannot be tolerated by conventional systems that use preferential oxidation (PROX) reactors to convert CO to $CO_2$. Water gas shift reactor 2 may contain either high or low temperature water gas shift catalysts, or both, depending on the nature of the reactor as described above. Conventional catalysts, such as $Fe_3O_4/Cr_2O_3$ for high temperature shift or $CuO/ZnO/Al_2O_3$ for low temperature shift, may be used.

The product gas, stream 19, from water gas shift reactor 2 contains primarily hydrogen, nitrogen, carbon monoxide, carbon dioxide and water. Stream 19 will typically contain about 0.5-5 mole % CO depending on the temperature of reactor 2, the space velocity of the feed gas, the steam to carbon ratio, and the catalyst(s) used. Reformate stream 19 is cooled in heat exchanger 7 to the operating temperature of adsorber 3 (60° C.-100° C.) by the purge exhaust stream 24 from adsorber 3. Additional cooling duty may optionally be provided by exchanging heat with cathode exhaust stream 27 or water stream 13 to cool stream 20 to its required temperature.

The cooled reformate stream 20 then flows to the high-pressure section of adsorber 3 where it is purified. The high-pressure section of the adsorber 3 will operate at a pressure between about 1.5 and about 5 $bar_a$. The detailed workings of adsorber 3 are described further hereinbelow.

There are several variations of the reformate product stream 21 leaving adsorber 3. In all the variations, CO levels in reformate stream 21 is less than about 100 ppm and preferably less than about 50 ppm. The CO from stream 20 is adsorbed on the adsorbent(s) in adsorber 3. In one aspect of the invention, only CO is adsorbed in adsorber 3 and reformate product stream 21 contains hydrogen, nitrogen, carbon dioxide and water. In a second aspect of the invention, both water and CO are adsorbed in adsorber 3, and reformate product stream 21 contains primarily hydrogen, nitrogen, and carbon dioxide.

In a third and more preferred aspect of the invention, nitrogen, carbon monoxide, carbon dioxide and water are all adsorbed in adsorber 3, and reformate product 21 contains mostly hydrogen. In this aspect, the reformate product stream 21 contains at least about 99% $H_2$ and preferably about 99.9% $H_2$, with the balance of stream 21 being nitrogen. Adsorbents that can be used for these three aspects are described below.

The $H_2$-rich reformate stream 21 from adsorber 3 is fed into the anode side of fuel cell stack 4. Inside the stack 4, the hydrogen from reformate stream 21 reacts with oxygen from air stream 26 to generate electricity. Stream 26 is air at the operating temperature (ambient −100° C.) and pressure (2 and 5 bara) of fuel cell stack 4 and is fed into the cathode side of the stack.

The fuel cell stack 4 generates exhaust gases from both the anode and cathode sides. The anode exhaust, stream 22, may contain hydrogen, nitrogen, carbon dioxide and/or water depending on the composition of reformate stream 21. Anode exhaust stream 22 exits fuel cell stack 4 at, preferably, about 2-3 bar absolute pressure. Anode exhaust 22 is expanded to atmospheric pressure in expander 10 (e.g. an isothermal expander) to be used as a purge gas, stream 23, for desorption of the adsorbed gases from adsorber 3. Other means for reducing the pressure of stream 22 can be employed, such as any variety of valves, nozzles, orifices, regulators, or the like. If an isothermal expander is used, the energy generated in expander 10, stream 30, can potentially serve to drive the rotor in adsorber 3 should a rotary adsorber be used (see below), although this is not essential for the function of the process. Expanded stream 23 should enter adsorber 3 at a temperature between about 60° C. and about 100° C. and at about atmospheric pressure. The adsorbed gases, which will include carbon monoxide, and possibly carbon dioxide, nitrogen, and/or water, are desorbed using the principles of pressure swing adsorption as described below. The purge gas exhaust stream 24 contains the desorbed gases from adsorber 3 and is fed into heat exchanger 7.

Another option not shown in FIG. 1 allows for reformate product stream 21 to be split into two fractions before entering fuel cell stack 4, with the majority fraction of stream 21 still going to the stack and the remainder being expanded for use as the purge gas in adsorber 3. In that aspect of the invention, the anode exhaust 22 would be mixed with adsorber purge exhaust gas 24 and then fed directly to heat exchanger 7.

Alternatively, gas from the cathode exhaust, stream 27, which contains primarily nitrogen, oxygen, and water, could be expanded and used as a purge gas for carbon monoxide desorption. This alternative is also not shown in FIG. 1. According to the invention, any gas stream or combination of gas streams that does not contain a significant amount of carbon monoxide may be used as a purge gas for regeneration of the carbon monoxide adsorbent. Other alternative purge gases include steam, air, nitrogen, or hydrogen, should they be available. The purge stream should be at a lower pressure than the feed stream (stream 20) and at about the same temperature as the feed stream. Another option allows for the adsorber to be purged by using a vacuum pump to pull off the adsorbed gases rather than using a purge stream.

Adsorber exhaust gas 24 is heated in heat exchanger 7 by reformate stream 19. The heated exhaust gas 25 from heat exchanger 7 flows to combustor 5. In this embodiment of the invention, cathode exhaust 27 is also fed directly into combustor 5, although it may be heated before entering the combustor. Inside combustor 5, the hydrogen and carbon monoxide from stream 25 react with the oxygen in stream 27 to form carbon dioxide and water. Heat is generated by the exothermic combustion reactions and leaves combustor 5 as hot combustor exhaust stream 28. This heat is used to vaporize the water from stream 13 in heat exchanger 8. Combustor exhaust stream 28 contains primarily nitrogen, carbon dioxide and water. Stream 28 is cooled in heat exchanger 8, and exits the system as stream 29. Combustor exhaust stream 28 may also optionally be used to preheat air stream 17. Liquid water may be collected from stream 29 and used as water to be fed into the system in stream 13.

An alternate embodiment of the system of the present invention is shown in FIG. 2. There are two main differences between the systems shown in FIGS. 1 and 2. In the system shown in FIG. 2, 1) steam is used as the preferred purge gas in adsorber 3 and 2) the desorbed CO is recycled back into the primary reactor. These differences are discussed below.

Referring now to FIG. 2, hydrocarbon fuel, air and steam are fed into primary reactor 1, as was the case in FIG. 1. Steam stream 14, which is generated by heating water stream 13 in heat exchanger 8, is fed into the low-pressure section of adsorber 3 as a purge stream to desorb the adsorbed carbon monoxide. Superheated steam stream 14 is fed into adsorber 3 at a temperature slightly above about 100□C. and at about atmospheric pressure. In this embodiment, the adsorbent in adsorber 3 selectively adsorbs CO from stream 20 in the high-pressure section of the adsorber. Most of the hydrogen, nitrogen, carbon dioxide and water in stream 20 passes through the adsorber and flows into the anode side of fuel cell stack 4 in virtually CO-free reformate stream 21. Stream 21 should contain less than about 100 ppm and preferably less than about 50 ppm carbon monoxide.

Exhaust stream 33 from adsorber 3 contains the steam used as low-pressure purge gas in the adsorber as well as the desorbed CO. Steam exhaust stream 33 is pressurized in compressor 10 to a pressure between about 2 $bar_a$ (bar absolute) and about 5 $bar_a$. Alternative techniques to pressurize the steam, such as an ejector, may be employed. Compressed steam stream 34 is mixed with compressed air stream 17 in mixing valve 9. The steam air mixture stream 15, which also contains the desorbed CO from adsorber 3, is heated in heat exchanger 6 and fed to primary reactor 1. An advantage of this embodiment is that the CO adsorbed in adsorber 3 is recovered and recycled back into the system so it can be reacted with water in water gas shift reactor 2 to produce more hydrogen.

In an alternative to the embodiment of FIG. 2, compressed steam stream 34, which contains the desorbed CO from adsorber 3, is split into two fractions. One fraction proceeds as described above, being mixed with air and sent to the primary reactor. The other fraction is either mixed with reformate stream 18 or fed directly into water gas shift reactor 2. In another alternative, steam stream 14 is split into two fractions. One fraction is blended directly with air stream 17 in mixing valve 9 to be fed into primary reactor 1. The other fraction serves as the low-pressure purge gas for desorption of CO from adsorber 3. The stream purge gas exhaust from adsorber 3, which contains the desorbed CO, is then compressed and recycled back into water gas shift reactor 2, either directly or by mixing with reformate stream 18. Additional alternatives not shown in FIG. 2 allow for additional water to be fed directly into water gas shift reactor 2 or blended with stream 18 as required by the water gas shift reaction.

Anode exhaust stream 22 is fed to heat exchanger 7 where it is heated using the reformate stream 19 after exiting water gas shift reactor 2. The hot anode exhaust stream 31 leaving heat exchanger 7 flows directly to combustor 5 where it reacts with cathode exhaust stream 27 as described in the embodiment of FIG. 1.

Gas streams besides steam may be used to purge the adsorber of CO as in FIG. 2. According to the invention, any gas stream or combination of gas streams that does not contain significant amounts of carbon monoxide and carbon dioxide may be used as a purge gas for regeneration of the carbon monoxide adsorbent. Other alternative purge gases include cathode exhaust stream 27, air, nitrogen, or hydrogen, should they be available. Another option allows for the adsorber to be purged by using a vacuum pump to pull off the adsorbed gases rather than using a purge stream. The purge stream should be at a lower pressure than the feed stream (stream 20) and at about the same temperature as the feed stream.

A further advantage of the present invention is the ability of the system to adsorb CO during startup, when the primary reactor is producing hydrogen and CO, but the water gas shift reactor 2 is still below its operating temperature. The incorporation of a CO adsorber permits stack grade $H_2$ (<100 ppm CO) to be generated almost immediately. The startup scenario is similar in both of the embodiments of FIGS. 1 and 2.

At startup, mixing valve 9 is set so that only air, and not water, enters the primary reactor along with the fuel until enough heat has been generated in the combustor to produce steam. Hydrogen and carbon monoxide are formed thermally or catalytically using a highly active catalyst on a electrically heated support in primary reactor 1 and flow into water gas shift reactor 2, which is still below its operating temperature and thus unable to shift CO and water into $CO_2$ and hydrogen.

At this point, one of two things may happen, depending on the exact nature of the system. If a low temperature CO adsorbent is added into or before water gas shift reactor 2 as described below, the CO in the cold reformate will adsorb on the adsorbent in water gas shift reactor 2. As water gas shift reactor 2 comes up to its operating temperature, the CO will desorb from the CO adsorbent and will be shifted to $CO_2$ on the water gas shift catalyst(s). At that point, normal operation will commence. If there is no CO adsorbent either inside or before water gas shift reactor 2, or there is not enough adsorbent to adsorb all of the CO in reformate stream 18, then the CO will pass through water gas shift reactor 2 and continue via streams 19 and 20 into adsorber 3. The remaining CO in stream 20 will adsorb in the high-pressure section of adsorber 3. In general, adsorbers operate more effectively at lower temperatures, so adsorber 3 will be able to adsorb CO effectively even before it reaches its final operating temperature. In both cases, normal operation can begin when 1) water gas shift reactor 2 has reached its operating temperature; and 2) enough heat has been generated in combustor 5 to produce the steam required for normal operation of reactors 1 and 2.

The present invention is not intended to be limited to the specifics of the systems as shown in the FIGS. as many changes and variations to theses embodiments may be made without departing from the inventive concept. For example, additional heating and cooling of any stream outside of the three heat exchangers described may be easily accomplished. Also, water may readily be recovered from a variety of streams, including streams 20, 21, 22, 24, 27, and 29 for reintroduction into the system.

In the embodiment of FIG. 1, where the reformate product from adsorber 3, stream 21, contains mostly hydrogen, adsorbent(s) should be used which will adsorb carbon monoxide, carbon dioxide, water, and nitrogen. This could be done using a single adsorbent material such as a zeolite. Commercial zeolite adsorbents such as type 5A and type 13X, and mixtures thereof are known to adsorb all of these materials. However, the capacity of these zeolites for carbon monoxide is relatively low compared to those of the other adsorbate gases. Therefore, it is preferred to add an adsorbent that has a relatively high capacity for carbon monoxide. For example, the carbon monoxide adsorbent may be a metal oxide or metal salt, such as copper, silver, or tin salt or oxide impregnated or exchanged on activated carbon, alumina or zeolites, and mixtures thereof. See, for example U.S. Pat. No. 4,917,711 issued to Xie et al; U.S. Pat. No. 4,696,682 issued to Hirai et al.; U.S. Pat. No. 4,587,114 issued to Hirai et al.; and U.S. Pat. No. 5,529,763 issued to Peng et al, each of the disclosures of which is incorporated herein by reference in its entirety. These carbon monoxide adsorbents may selectively adsorb water instead of carbon monoxide. Therefore, a layer of a desiccant (water adsorbent) may be put in the adsorber vessel upstream of the carbon monoxide adsorbent. The desiccant may be any conventional water adsorbent such as a zeolite molecular sieve, activated alumina, silica gel, or mixtures thereof.

In the embodiment of FIG. 2, where primarily CO is adsorbed in adsorber 3, an adsorbent should be used which selectively adsorbs carbon monoxide over carbon dioxide in the presence of water and nitrogen. Such an adsorbent may be a metal oxide or metal salt, such as copper, silver, or tin salt or oxide impregnated or exchanged on activated carbon, alumina or a high-silica zeolite such as type Y or ZSM-5.

The combining of materials can be accomplished by preparing layers of distinct particles, such as beads or extrudates, of the various adsorbents. The adsorbent materials may also be preferably formed together into a single particle, such as a bead or an extrudate, or, most preferably, formulated into monoliths, foams, honeycombs or the like.

Additionally, the water gas shift reactor may also contain a carbon monoxide adsorbent that will adsorb carbon monoxide at temperatures below the activation temperature of the water gas shift catalyst. This will help to ensure that carbon monoxide will not break through the reactor during startup from ambient temperatures, when the water gas shift catalyst is still relatively cold, until the operating temperature of the reactor is achieved. The carbon monoxide adsorbent will have a much lower capacity for carbon monoxide at the higher steady-state operating temperature of the reactor. A layer of the carbon monoxide adsorbent may be placed in front of the water gas shift catalyst, or the two materials may be combined into a single layer. The carbon monoxide adsorbent may be a tin, copper or silver salt impregnated on activated carbon, alumina or a zeolite. The carbon monoxide is regenerated from the adsorbent as the reactor is heated to its operating temperature and can then be either converted to carbon dioxide in the water gas shift reactor or readsorbed downstream in the adsorber.

Conventional pressure swing adsorption (PSA) systems are very large and consist of a minimum of two separate adsorption vessels complete with numerous valves and manifolds. In a two-vessel system, one vessel would be in the adsorption mode and the second vessel would be in various stages of depressurization or blowdown, purge, and pressurization. Many commercial hydrogen PSA cycles use four beds, with one bed in the production stage at any given time, and the other three beds in various stages of equalization, blowdown, purge, and pressurization. See, for example U.S. Pat. No. 3,453,418 issued to Wagner; and U.S. Pat. No. 3,564,816 issued to Batta, each of the disclosures of which is incorporated herein by reference in its entirety. Also, some commercial hydrogen PSA cycles use twelve beds, with four beds in the production stage at any given time, and the other eight beds in various stages of equalization, blowdown, purge, and pressurization. See for example U.S. Pat. No. 3,846,849 issued to Fuderer et al., the disclosure of which is incorporated herein by reference in its entirety. These PSA cycle stages are described in detail below. It is well known that PSA systems with more than two vessels exhibit higher hydrogen recoveries and reduced power by incorporating pressure equalization steps. These multiple, staged fixed bed PSA systems, however, contain complex valve arrangements and are non-continuous due to the cycling of these valves.

Alternatively, rotating adsorber vessels allow for continuous production in a relatively small system with minimum valving. Rotating pressure swing adsorption systems are described by Petit et al in U.S. Pat. No. 5,441,559; and by Keefer et al. in PCT publication No. WO 99/28013, each of the disclosures of which is incorporated herein by reference in its entirety. In order for the adsorber of this invention to be small enough to fit in a vehicle, this invention preferably uses a single rotating vessel 3 with only two fixed valve faces. Rotation of the vessel 3 allows the adsorbent mixture to cycle between fixed regions for adsorption, depressurization, purge, and pressurization (as described below) with cycle times much smaller than those of conventional PSA systems. Further features of the rotary adsorber are described below with reference to FIG. 3. The cycle in which the adsorber is used will now be described.

The cycle stages for the adsorber are as follows.

Adsorption

During the adsorption step, the reformate effluent from the water gas shift reactor 2 is fed over the adsorbent(s) at the higher feed pressure. In the embodiment of FIG. 2, only carbon monoxide adsorbs on the adsorbent. Alternatively, in the embodiment of FIG. 1, carbon monoxide, carbon dioxide, water, and nitrogen may all adsorb so the product gas contains greater than 99% hydrogen by volume. In that case, the remainder of the adsorber product is primarily nitrogen. In either case, the adsorber product gas will contain less than about 100 ppm carbon monoxide, and, preferably, less than about 50 ppm carbon monoxide. The production step is stopped before carbon monoxide breaks through the outlet of the adsorber vessel. At the end of the production step, the adsorbent is nearly saturated with the adsorbed gases and the vessel is at elevated pressure with hydrogen, carbon monoxide, carbon dioxide, water, and nitrogen.

Depressurization

The adsorber vessel is depressurized from the feed pressure to the purge pressure by exhausting the gas in the direction counter-current to the adsorption direction. During depressurization, the outlet of the adsorber vessel is sealed. Alternatively, the vessel can be depressurized co-currently, and the vessel inlet is sealed. The depressurization exhaust gas contains hydrogen, carbon monoxide, carbon dioxide, water, and nitrogen. The exhaust will exit the adsorber vessel at atmospheric pressure and can be sent to the combustor or recycled into another part of the adsorber or the fuel processor system.

Purge

The adsorber vessel is purged with the expanded exhaust from the PEM fuel cell stack, low pressure superheated steam, or other suitable purge gas as described above for the preferred embodiments of the invention (such as a fraction of the CO-free reformate). The purge stream flows at ambient pressure in the direction counter-current to the adsorption direction. The adsorber may also be purged by pulling a vacuum from the direction counter-current to the adsorption direction using a vacuum pump. The exhausted purge gas will contain most of the adsorbed carbon monoxide and other adsorbed gases. The purge step is terminated when essentially all of the carbon monoxide and other adsorbed gases have been desorbed from the adsorbent(s).

Pressurization

The adsorber vessel is pressurized back up to the adsorption pressure in the same direction as the adsorption step using the cooled hydrogen-rich product from water gas shift reactor 2, stream 20. During pressurization, the outlet of the vessel is sealed. Alternatively, the vessel may be pressurized using a fraction of the hydrogen-rich product from the adsorber, stream 21, in a direction counter-current to the production direction, and the vessel inlet is sealed. After pressurization, the adsorber returns to the adsorption step and the cycle continues indefinitely.

Equalization stages, which are well known to those skilled in the art of PSA systems, may be added to the adsorption cycle to enhance hydrogen recovery. For example, one vessel or section of the rotating vessel that has just completed the adsorption step may be equalized, or connected via the outlets of both sections, with another section that has just completed the purge step. During this equalization, the pressure in the first section is reduced and the pressure in the second section is increased accordingly. Also, the hydrogen remaining in the first section of the vessel at the end of adsorption is partially recovered in the second section, which has completed the purge step.

Figure 3:
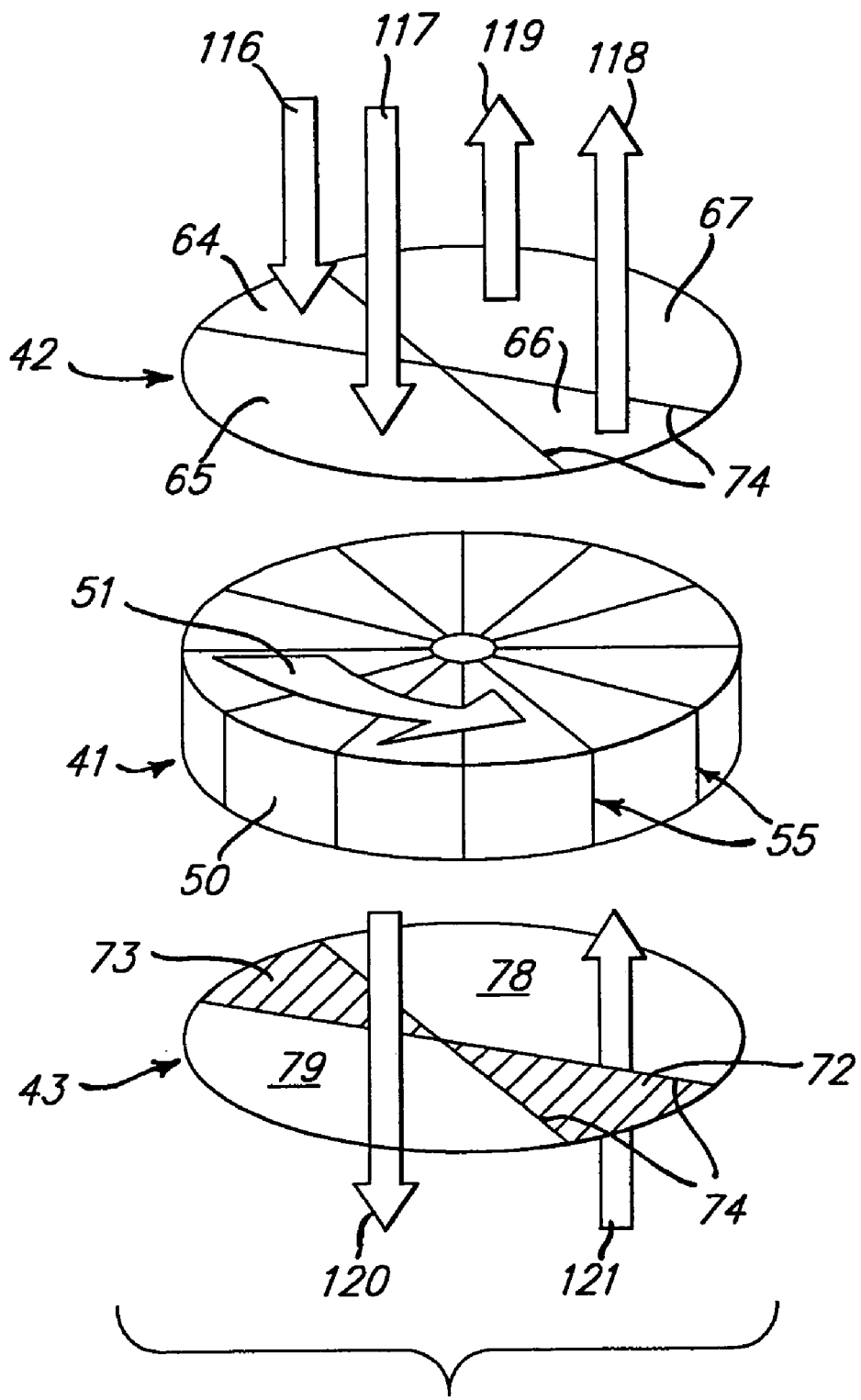
FIG. 3 is a partially schematic, perspective view of an exemplary adsorber of the preferred embodiment of the present invention.

An exemplary rotary adsorber is shown in FIG. 3.

Description of Rotary Adsorber

A simplified schematic of an exemplary rotary adsorption apparatus is shown in FIG. 3. The rotary adsorber comprises a wheel 41 of adsorbent material; an upper valve face 42; and a lower valve face 43. The adsorbent wheel 41 is simply referred to as wheel 41 hereinafter. Upper valve face 42 will be in direct contact with the top of wheel 41 and lower valve face 43 will be in direct contact with the bottom of wheel 41. The wheel and the two valve faces form an assembly that is enclosed in a housing (not shown) in FIG. 3.

Wheel 41 is made up of pie shaped compartments 50. Preferably, there are a minimum of twelve such adsorbent compartments. The compartments 50 are separated from each other by walls 55. The walls 55 prevent intercompartmental (tangential) flow, thus ensuring that the gases flow only in the axial direction through wheel 41. Wheel 41 rotates in the counterclockwise direction as indicated by arrow 51. Wheel 41 is rotated either by a rotor (not shown) that passes through the center of the wheel or a belt (not shown) in contact with the outer housing of the wheel. Stationary valve faces 42 and 43 do not move as wheel 41 rotates.

Upper valve face 42 is divided into subsections 64, 65, 66, and 67. These subsections are open windows that allow gas to flow through. Subsections 64, 65, 66, and 67 are separated by barrier seals 74. Barrier seals 74 prevent gas from flowing between the subsections. Stream 116 is the feed gas for the pressurization step of the PSA cycle and flows through subsection 64. Stream 117 is the feed gas for the production step of the PSA cycle and flows through subsection 65. Stream 118 is the exhaust gas from the depressurization step of the PSA cycle and flows through subsection 66. Stream 119 is the exhaust gas from the purge step of the PSA cycle and flows through subsection 67.

Lower valve face 43 is divided into subsections 72, 73, 78, and 79. Subsections 78 and 79 are open windows that allow gas to flow through. Subsections 72 and 73 are solid faces that prevent gases from flowing through. Subsections 72, 73, 78, and 79 are separated by barrier seals 74. Barrier seals 74 prevent gas from flowing between the subsections. Stream 120 is the product gas from the production step of the PSA cycle and flows through subsection 79. Stream 121 is the feed gas for the purge step of the PSA cycle and flows through subsection 78. Solid face of subsection 73 prevents gas from entering or exiting the bottom of wheel 41 during the pressurization step of the PSA cycle. Solid face of subsection 72 prevents gas from entering or exiting the bottom of wheel 41 during the depressurization step of the PSA cycle.

The rotary adsorber system shown in FIG. 3 is a basic, generic device shown here for the purpose of identifying the key features of a rotary adsorber and their functions. There are many variations to the device not shown in FIG. 3 that would provide a suitable device for use in the fuel processing system of the invention.

In one aspect, stream 116 of FIG. 3 is constituted by a part of stream 20 of FIGS. 1 and 2. In another aspect, stream 117 of FIG. 3 is essentially the same as stream 20 of FIGS. 1 and 2. Similarly, in one aspect, stream 118 of FIG. 3 is constituted by a part of stream 24 of FIG. 1, and stream 118 is constituted by a part of stream 33 of FIG. 2. As shown here, stream 119 for exhaust gas purge is essentially the same as stream 24 of FIG. 1, and stream 119 exhaust gas purge of FIG. 3 is essentially the same as stream 33 of FIG. 2. Finally, stream 120 of FIG. 3 is essentially the same as stream 21 of FIGS. 1 and 2; and stream 121 of FIG. 3 is essentially the same as stream 23 of FIG. 1, and stream 14 of FIG. 2.

The pressurization and depressurization steps require a relatively small flow stream and, therefore, as illustrated here, a portion of the streams recited earlier with respect to FIG. 3, namely stream 116 and stream 118, respectively, are used. However, other methods could be used to accomplish the pressurization and depressurization steps. Thus, streams 116 and 118 are relevant to the overall process in that they facilitate operation of the rotary adsorber system. The key features described here pertain to processing of a feed stream designated as stream 20 of FIGS. 1 and 2 and stream 117 of FIG. 3, to provide a product stream designated as stream 21 of FIGS. 1 and 2 and stream 120 of FIG. 3 to supply the anode.

Advantages of a fuel cell system using an adsorber for hydrogen purification for automotive fuel cell applications as compared to conventional methods include one or more of the following:

1) The ability to remove CO at startup, therefore reducing the time required to produce stack grade hydrogen;
2) The potential to produce 99.9% hydrogen (embodiment of FIG. 1);
3) The potential to recover CO for improved system efficiency (embodiment of FIG. 2);
4) Elimination of low temperature water gas shift reactor, if desired;
5) Elimination of precious metal catalysts typically used in preferential oxidation (PROX);
6) No dilution of hydrogen product with nitrogen from air used for preferential carbon monoxide oxidation;
7) Elimination of air compression for preferential oxidation resulting in power savings;
8) Elimination of low-grade excess heat generated by preferential oxidation; and
9) The ability to control the adsorption unit's cycling rate to optimize efficiency over a wide range of operating loads.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for improving the quality of a hydrogen-containing gas stream comprising:

producing a first gas stream having a hydrogen content and a carbon monoxide content in a first reactor;

passing said first gas stream through a shift reactor to produce an effluent stream, said shift reactor including a first reaction region having a water gas shift catalyst and a second reaction region having a first carbon monoxide adsorbent;

adsorbing said carbon monoxide content from said first gas stream in said second reaction region when said shift reactor is at a substantially ambient temperature and pressure condition; and desorbing said carbon monoxide content from said first gas stream in said second reaction region when said shift reactor is at a normal shift reactor operating temperature and pressure condition which is above said substantially ambient temperature and pressure condition.

2. The method of claim 1 further comprising purging said shift reactor by introducing a purge gas in a direction countercurrent to said first gas stream.

3. The method of claim 1 further comprising passing said effluent stream through a first region of a second carbon monoxide adsorbent in a pressure swing adsorber vessel to adsorb carbon monoxide from said effluent stream.

4. The method of claim 3 further comprising passing a purge gas through a second region of said second carbon monoxide adsorbent in said pressure swing adsorber vessel to desorb carbon monoxide from said carbon monoxide adsorbent.

5. The method of claim 4 further comprising rotating said second carbon monoxide adsorbent through an adsorption region, a depressurization region, a purge region and a pressurization region.

* * * * *